March 21, 1933.    L. F. STRENG    1,902,734
BREAD WRAPPING MACHINE
Filed July 22, 1932    3 Sheets-Sheet 1

Leo F. Streng,
Inventor,
Delos G. Haynes,
Attorney

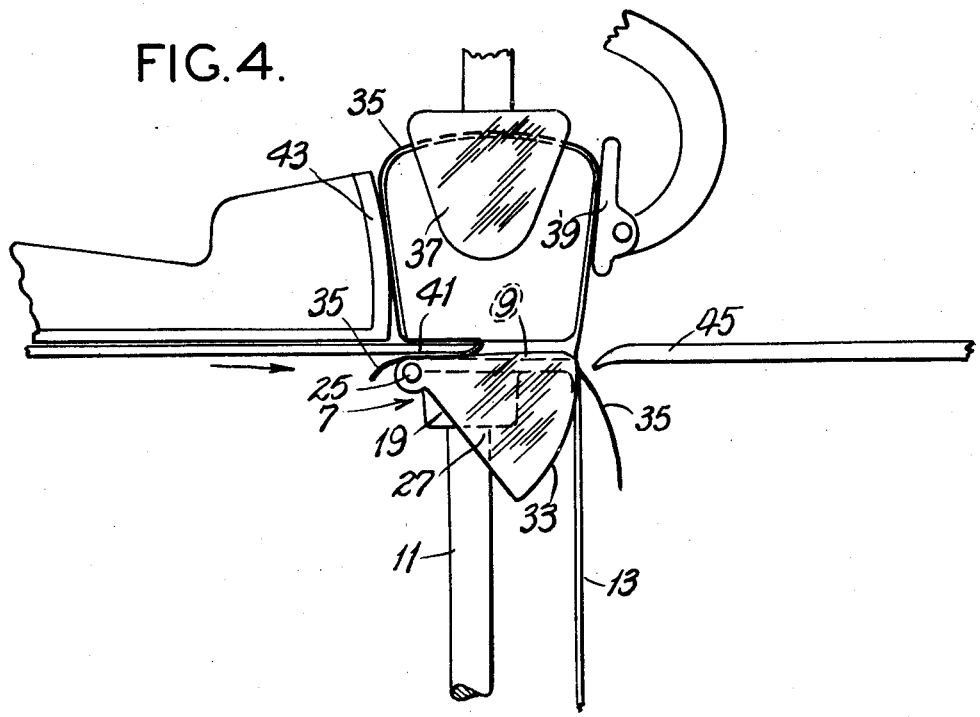
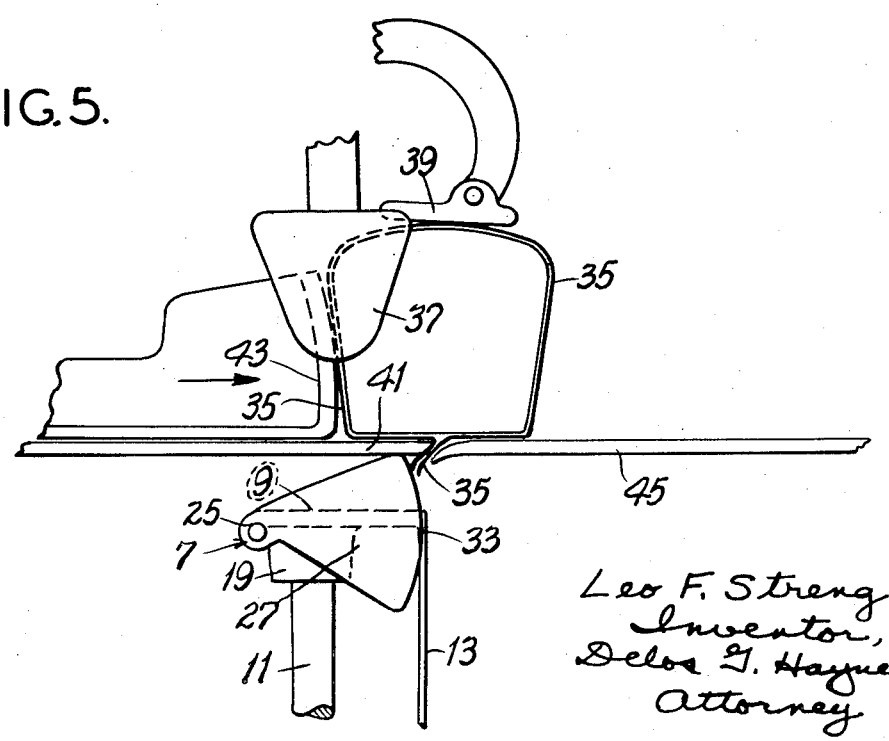

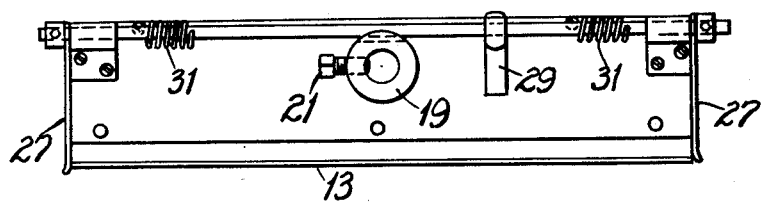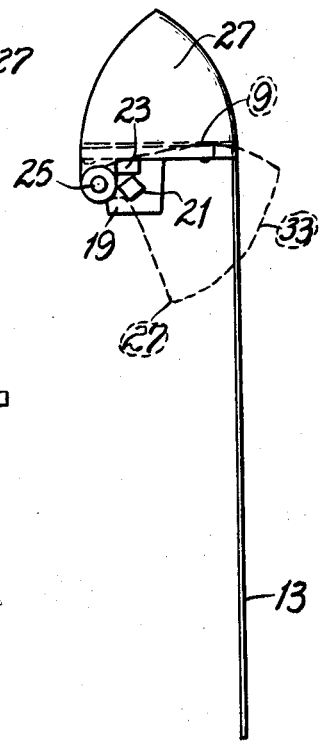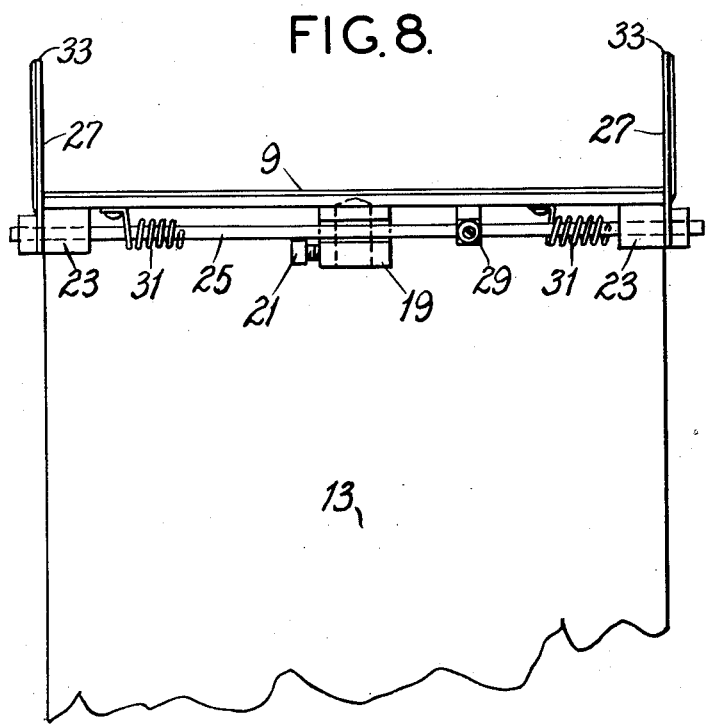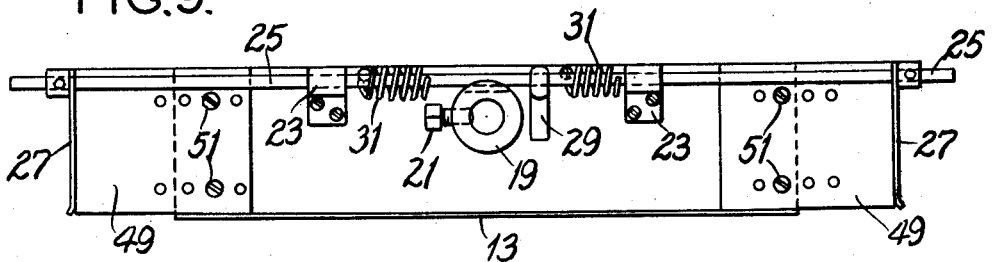

Patented Mar. 21, 1933

1,902,734

UNITED STATES PATENT OFFICE

LEO F. STRENG, OF COLUMBIA, MISSOURI, ASSIGNOR TO STRENG BAKERY APPLIANCE COMPANY, OF COLUMBIA, MISSOURI, A CORPORATION OF MISSOURI

BREAD WRAPPING MACHINE

Application filed July 22, 1932. Serial No. 624,008.

This invention relates to bread wrapping machines, and with regard to certain more specific features, to bread wrapping machines for wrapping sliced loaves of bread.

Among the several objects of the invention may be noted the provision of a relatively simple attachment for existing machines adapted only to wrap unsliced loaves of bread, whereby said machine may be made capable of wrapping sliced loaves of bread, but without the use of bands, trays, or other means heretofore associated with sliced loaves of bread; and the provision of an attachment of the class described which may be adjusted according to the size of the loaf being wrapped. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Figs. 1 through 5 are digrammatic views illustrating progressively the manner in which a sliced loaf of bread is wrapped, utilizing the present invention;

Fig. 6 is a bottom plan view of an attachment made in accordance with the present invention;

Fig. 7 is an end elevation of the attachment shown in Fig. 6;

Fig. 8 is a front elevation of the attachment shown in Fig. 6; and,

Fig. 9 is a bottom plan view, similar to Fig. 6, showing an alternative form of the invention.

Similar reference characters indicate corresponding parts throughout the several views of the drawings.

Figure 1:
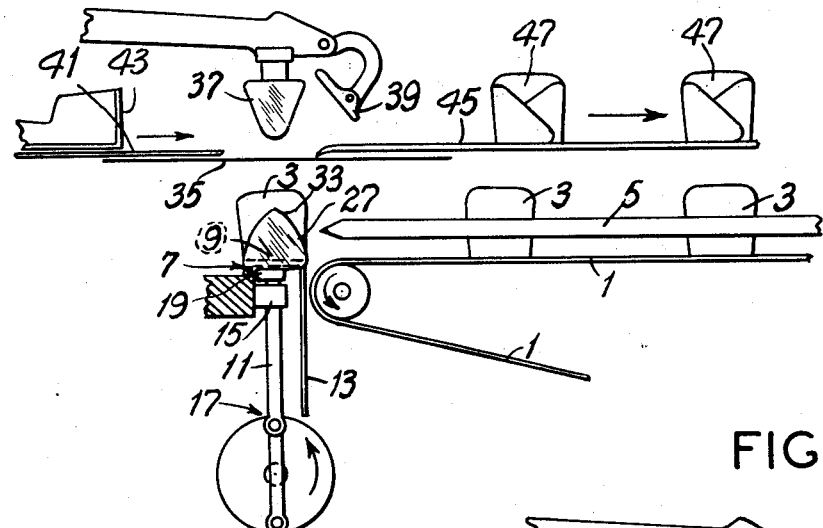

Within the past few years a demand has been created for packaged bread in which the loaves, instead of being whole, are pre-sliced for direct household consumption. Of course such pre-sliced bread must be handled and packaged at the point of its manufacture, that is, the bakery. A sliced loaf of bread, in order to be maintained in loaf shape, must be held longitudinally, or cross-wise to the direction of the cuts.

In one method now used for handling such sliced loaves, they are placed in a tray of cardboard which supplies the necessary endwise compression to maintain the loaf-shapes. The loaf in the tray may then be handled as an unsliced loaf. This method is disadvantageous in requiring the separate trays which, when the low selling price of bread is considered, represent a considerable added cost to the baker.

In another method now used, the tray is replaced by a pasted paper band passed laterally about the sliced loaf to hold it in shape. This method is open to the same objections as the tray method.

Wrapping machines are now on the market which handle sliced loaves without either trays or bands. However, these machines are complicated and expensive, and necessitate junking of existing unsliced loaf wrapping machines which are otherwise perfectly usable.

The present invention comprises an attachment for such existing unsliced loaf wrapping machines which makes such machines readily capable of handling sliced loaves without using trays or bands. The attachment is economical to manufacture and install. Thus, for the small investment necessary for the present invention, the baker is enabled to convert his present unsliced loaf wrapping machine into a sliced loaf wrapping machine, and thereby avoid the large investment necessary to install an entirely new wrapping machine.

In describing the present invention, no attempt has been made to fully show or describe the details of the existing wrapping machine, only general features cooperating particularly with the present invention being considered.

Referring now more particularly to Figs. 1 to 5, numeral 1 indicates a conveyor belt carrying loaves 3 of sliced bread from the slicing machine. The conveyor 1 includes side rails or flanges 5 preventing falling apart of the sliced loaves while travelling thereon.

The conveyor 1 delivers the loaves 3 on to an elevator 7, comprising a platform 9, upright 11, and front apron piece 13. The upright 11 slides in a fixed bearing 15. Reciprocating means 17 push the platform 9 up and down at predetermined times.

It is upon the elevator 7 that the attachment comprising the present invention is mounted. In the wrapping machine as heretofore provided, the platform 9 was perfectly free of edge obstructions, or end pieces, and in such cases the sliced loaf of bread, upon being placed on the platform, fell apart endwise and could not be wrapped.

The attachment comprising the invention is illustrated more in detail in Figs. 6, 7, and 8. Upon the under side of the platform 9 is secured a socket 19, adapted to receive, and hold by means of a set screw 21, the upright 11. Also mounted on the under side of platform 9, upon the edge opposite to the apron 13, are a pair of bearings 23 rotatably supporting a shaft 25. On the ends of shaft 25 are mounted wings or end pieces 27. A stop 29 is likewise mounted on shaft 25, but beneath the platform 9 (the wings 27 being clear of the ends of said platform 9). Coil springs 31 are secured at one end to the shaft 25 and bear at their other end upon platform 9, tending to rotate the shaft 25 such that the wings 27 extend upwardly above the top of platform 9 (Figs. 7 and 8). The stop 29 limits rotation in this direction. It will be seen that, by pressing on the top edges 33 of wings 27, said wings may be depressed, against the springs 31, to a position under the upper surface of platform 9 (dotted lines, Fig. 7).

The apron 13 extends downwardly from the front edge of the platform 9. In the present invention, it is desirably a solid sheet (in the former machines, it comprised a plurality of spaced strips), as its function is to form an abutment for advancing loaves of bread 3 on conveyor 1, and strips alone do not serve to stop sliced loaves, as will be apparent.

The normal position of the wings 27 is in their upper, full line position (Fig. 7).

Returning now to Figs. 1 to 5, the sliced loaf, as it advances from conveyor 1 on to platform 9, is compressed at its ends by the upwardly extending wings 27, and thus prevented from falling apart.

Figure 2:
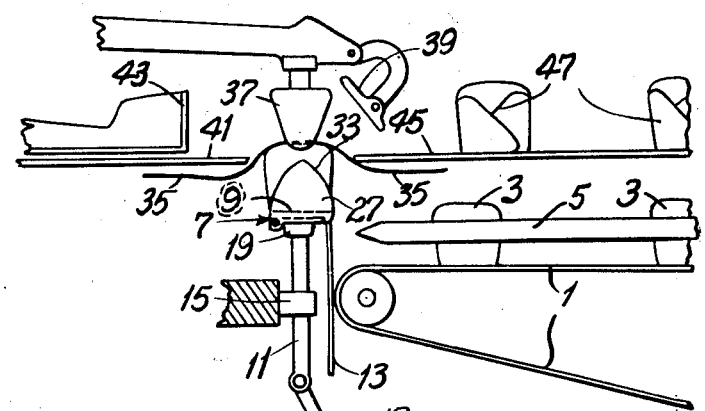
Figure 3:
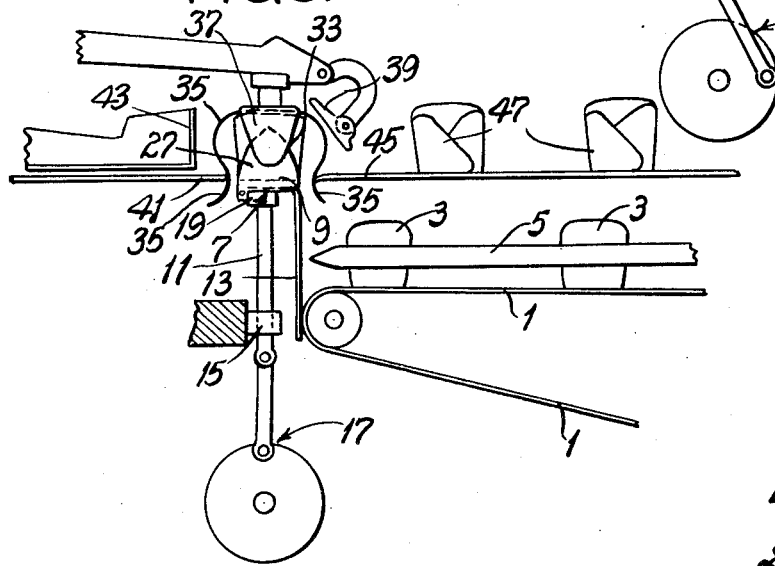

The elevator 7 now commences to rise. Numeral 35 indicates the sheet of paper in which the loaf is to be wrapped. Numerals 37 and 39, respectively, indicate end and side folding plates. As the elevator rises, the top of the loaf is pushed up under the paper 35, and continues to rise carrying said paper with it (Figs. 2 and 3). When the elevator reaches the top of its travel (Figs. 3 and 4) the end folding plates 37 are embracing the wings 27, ready to receive the ends of the loaf 3. A slide 41 now advances to fold the paper under the loaf 3. As slide 41 advances (Fig. 4) it engages the upper edges 33 of wings 27, and pushes said wings downwardly against the springs 31. In effect, the slide 41 lifts the loaf 3 off the platform 9, and said platform begins to sink to receive another loaf from conveyor 1 (Fig. 5).

When the wings 27 are pushed downwardly by the slide 41, the loaf 3 does not fall apart, as it is now held, endwise, by the end folding plates 37. Following slide 41 is a pusher 43, which pushes the now partially wrapped loaf 3 off the slide 41 and on to a platform 45, wherein certain finishing operations (such as sealing) are done on the now packaged loaves. The wrapped loaves (numeral 47 in Fig. 1) are delivered from the platform 45 for sale or storage or the like.

As the elevator 7 lowers (Fig. 5) the springs 31 force the wings 27 back into upper position so that by the time said elevator is at a level to receive another loaf 3, the wings are ready to hold said additional loaf from falling apart.

An advantage of the present invention is the fact that, when it is installed, it in no way interferes with the action of the wrapping mechanisms. Unsliced loaves as well as sliced loaves might accordingly be wrapped without any attention to the attachment.

In Fig. 9 is illustrated a modification of the invention wherein the elevator is made adjustable in length to provide for bread loaves of varying length. This is done by the provision of adjustable end extensions 49 on platform 9, held in position by set screws 51, and by providing a longer shaft 25, with the wings 27 laterally adjustable therewith to conform to the extensions 49. Otherwise, the embodiment is the same as that heretofore described.

It is to be understood that the details of the bread wrapper elements per se, as set forth hereinabove, are not considered fully descriptive of such elements, but descriptive only insofar as they relate to or coact with the elevator mechanism.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a bread wrapping machine, an elevator, wrapping means including end folding plates and a bottom plate adapted to force the wrapping material beneath the loaf being wrapped, said elevator including collapsible end wings adapted to hold sliced loaves from falling apart, said end wings remaining in position until said loaf is positioned between said end folding plates, said bottom plate and said wings being so shaped that as said bottom plate advances to force the wrapping material beneath said loaf, it collapses said end wings.

2. An elevator for bread wrapping machines comprising a platform, rotatable means mounted in bearings along one edge of said platform, wings mounted on said rotatable means at the ends of said platform, and spring means between said rotatable means and said platform normally rotating said rotatable means in such direction that said wings extend above the upper surface of said platform.

3. An elevator for bread wrapping machines comprising a platform, rotatable means mounted in bearings along one edge of said platform, wings mounted on said rotatable means at the ends of said platform, and spring means between said rotatable means and said platform normally rotating said rotatable means in such direction that said wings extend above the upper surface of said platform, and stop means associated with said wings limiting the extent of rotation of said wings in the direction urged by said spring means.

4. An elevator for bread wrapping machines comprising a platform, rotatable means mounted in bearings along one edge of said platform, wings mounted on said rotatable means at the ends of said platform, and spring means between said rotatable means and said platform normally rotating said rotatable means in such direction that said wings extend above the upper surface of said platform, and an apron depending from the edge of said platform opposite to the edge which supports said rotatable means.

5. An elevator for bread wrapping machines comprising a platform, rotatable means mounted in bearings along one edge of said platform, wings mounted on said rotatable means at the ends of said platform, and spring means between said rotatable means and said platform normally rotating said rotatable means in such direction that said wings extend above the upper surface of said platform, and an apron depending from the edge of said platform opposite to the edge which supports said rotatable means, said apron comprising a solid sheet.

6. An elevator for bread wrapping machines comprising a platform, adjustable extensions on the ends of said platform whereby the overall length thereof may be varied, a shaft mounted in bearings along one edge of said platform, said shaft extending beyond the ends of said platform, wings non-rotatably mounted on said shaft, said wings being adjustable in position along said shaft to correspond to the adjustment of said extensions, and spring means between said shaft and said platform normally rotating said shaft in such direction that said wings extend above the upper surface of said platform.

7. An elevator for bread wrapping machines comprising a platform, adjustable extensions on the ends of said platform whereby the overall length thereof may be varied, a shaft mounted in bearings along one edge of said platform, said shaft extending beyond the ends of said platform, wings non-rotatably mounted on said shaft, said wings being adjustable in position along said shaft to correspond to the adjustment of said extensions, and spring means between said shaft and said platform normally rotating said shaft in such direction that said wings extend above the upper surface of said platform, and a stop member on said shaft limiting the extent of rotation of said shaft in the direction urged by said spring means.

8. An elevator for bread wrapping machines comprising a platform, rotatable means mounted in bearings along one edge of said platform, wings mounted on said rotatable means at the ends of said platform, and spring means normally rotating said wings in such direction that they extend above the upper surface of said platform.

9. An elevator for bread wrapping machines comprising a platform, rotatable means mounted in bearings along one edge of said platform, wings mounted on said rotatable means at the ends of said platform, spring means normally rotating said wings in such direction that they extend above the upper surface of said platform, and means for adjusting the length of said platform between said wings, whereby loaves of bread of varying lengths may be accommodated.

In testimony whereof, I have signed my name to this specification this 20th day of July, 1932.

LEO F. STRENG.